United States Patent [19]
Zeoli et al.

[11] Patent Number: 5,448,241
[45] Date of Patent: Sep. 5, 1995

[54] TERRAIN HEIGHT RADAR

[75] Inventors: Gene W. Zeoli, Palos Verdes Estates; Ralph E. Hudson, Los Angeles; Robert H. Latter, Manhattan Beach; Robert T. Frankot, Van Nuys, all of Calif.

[73] Assignee: Hughes Aircraft Company, Los Angeles, Calif.

[21] Appl. No.: 249,488

[22] Filed: May 26, 1994

[51] Int. Cl.⁶ .............................................. G01S 13/90
[52] U.S. Cl. ..................... 342/25; 342/123; 342/145; 342/194; 342/196
[58] Field of Search ................. 342/25, 123, 145, 192, 342/194, 196, 197

[56] References Cited

U.S. PATENT DOCUMENTS

| | | | |
|---|---|---|---|
| 4,325,065 | 4/1982 | Caputi, Jr. | 342/25 |
| 4,851,848 | 7/1989 | Wehner | 342/25 |
| 4,924,229 | 5/1980 | Eichel et al. | 342/25 |
| 5,329,283 | 7/1994 | Smith | 342/25 |

Primary Examiner—John B. Sotomayor
Attorney, Agent, or Firm—Leonard A. Alkov; W. K. Denson-Low

[57] ABSTRACT

A terrain height radar system and processing method comprising a high resolution synthetic aperture radar (SAR) mounted on an air vehicle and a SAR signal processor containing a signal processing algorithm or method for computing terrain height and radar backscatter power. The system contains motion sensing and navigation functions that also provide data to the signal processor to provide motion compensation. Signal processing algorithms in the method compensate for planar motion of the air vehicle for variations of terrain height in the field of view. The algorithms also compensate for nonplanar motion of the radar, and for scatterers in or very near to a reference plane in the field of view. The algorithms exploit defocusing due to displacement from the reference plane to estimate the terrain height above the reference plane. The algorithm is computationally efficient because the bulk of the radar signal processing is common to both the SAR function and the terrain height estimation function. The following processing method is implemented. The synthetic array radar is operated to produce out-of-plane motion and generating radar return signals derived therefrom. The radar return signals are processed to compensate for relative motion, generate ground plane polar format data, generate range compressed data, and generate autofocused data. Azimuth compressed data is generated by focusing uncompressed azimuth data for each of many discrete terrain height reference levels, compressing the focused data using a weighted FFT, temporarily recording the magnitude of each pixel, storing separate image magnitude values corresponding to each terrain height reference level for each pixel and outputting the largest of these magnitudes for each pixel as a radar cross section value of that pixel, and outputting the height reference level at which that maximum occurred as the height of that pixel. Interpolation may be used to refine the height estimate. The strong scatterer signal is then canceled by estimating the amplitude phase height and azimuth of the strong scatterer, using these parameters to determine a contribution in the uncompressed data set due to the strong scatterer, subtracting this contribution from the uncompressed data, and repeating the amplitude phase height and azimuth height estimating step to provide for for improved accuracy.

3 Claims, 2 Drawing Sheets

TERRAIN HEIGHT RADAR

BACKGROUND

The present invention relates generally to radar systems, and more particularly, to a terrain height radar system comprising a signal processing method that computes terrain height and radar backscatter power and calculates terrain relief while performing SAR imaging.

Prior art relating to the present invention includes on-the-ground survey systems using chain and transit, stereoscopic aerial photography, stereoscopic SAR imaging, single pass dual channel interferometric SAR, and dual pass single channel interferometric SAR. However, these conventional systems for producing terrain height data are generally not used in all types of weather, day or night. Such systems are not used at long range. In the case of conventional SAR imaging systems, they may require radar modifications. The conventional systems do not operate with minimum exposure of the air vehicle. No conventional system has used single pass, single channel operation. The conventional systems require substantial active transmission, thus increasing aircraft vulnerability. Also no conventional system corrects for vertical depth of field.

Accordingly, it is an objective of the present invention to provide for a terrain height radar system that overcomes the limitations of conventional systems.

SUMMARY OF THE INVENTION

The present terrain height radar system is comprised of a high resolution synthetic aperture radar (SAR) mounted on an air vehicle and a SAR signal processor containing signal processing algorithms that compute terrain height and radar backscatter power. The system contains motion sensing and navigation functions that also provide data to the signal processor to provide for motion compensation of the SAR image. The signal processing algorithms compensate for the motion of the air vehicle. This algorithm also compensates for nonplanar motion of the radar, with respect to scatterers in or very near to a reference plane in the field of view. Scatters displaced from the reference plane will be defocused by an amount proportional to the scatter displacement and the out-of-plane motion of the radar. The processing algorithm exploits defocusing due to displacement from the reference plane to estimate the terrain height above the reference plane. The algorithms are computationally efficient because the bulk of the radar signal processing is common to both SAR image processing and terrain height estimation processing. The calculations for height estimation are highly repetitive and each repetition is only a small fraction of the normal SAR calculation.

More specifically, the present invention provides for a synthetic array radar system and signal processing method, that implements the following processing steps. The synthetic array radar is operated during out-of-plane movement and generates radar return signals. The radar return signals are processed to compensate for relative motion and provide motion compensated data. The motion compensated data is processed to generate ground plane polar format data. The ground plane polar format data is processed to generate range compressed data. The range compressed data is processed to generate autofocused data.

The autofocused data is then processed to generate azimuth compressed data by focusing uncompressed azimuth data for each of many discrete terrain height reference levels; compressing the focused data using a weighted Fourier transform (FFT); temporarily recording the magnitude of each pixel; storing separate magnitudes for each terrain height reference level for each pixel; outputting the largest magnitude from among all of the magnitudes for each of the terrain height reference levels for each pixel as a radar cross section value of that pixel; and outputting the reference level at which that maximum occurred as the height of that pixel. Strong scatterer signals are canceled by estimating the amplitude, phase, height, and azimuth of each strong scatterer; using these parameters to determine a contribution in the uncompressed data set due to the strong scatterer; subtracting this contribution from the uncompressed data; and repeating the amplitude, phase, height, and azimuth estimating step to improve accuracy.

The present invention calculates terrain relief (height) while performing SAR imaging. The terrain height data generated by the system has conventional uses associated with maps and charts. Terrain height data in precise registration with radar data has several unique advantages. The terrain relief data aids in the recognition of landmarks or (offset) aim points. Terrain height data may be used to reduce false alarm rates in SAR change detection through ortho-rectification. Target height data may be used to improve weapon delivery accuracy. The present method of producing terrain height data is especially advantageous because it may be used in all types of weather, day or night; it may be used at long range; it requires no radar modifications; it requires no additional SAR data bandwidth; it operates with minimum exposure of the air vehicle; it uses single pass, single channel operation; it requires minimal active transmission, thus reducing aircraft vulnerability; and it corrects for vertical depth of field.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
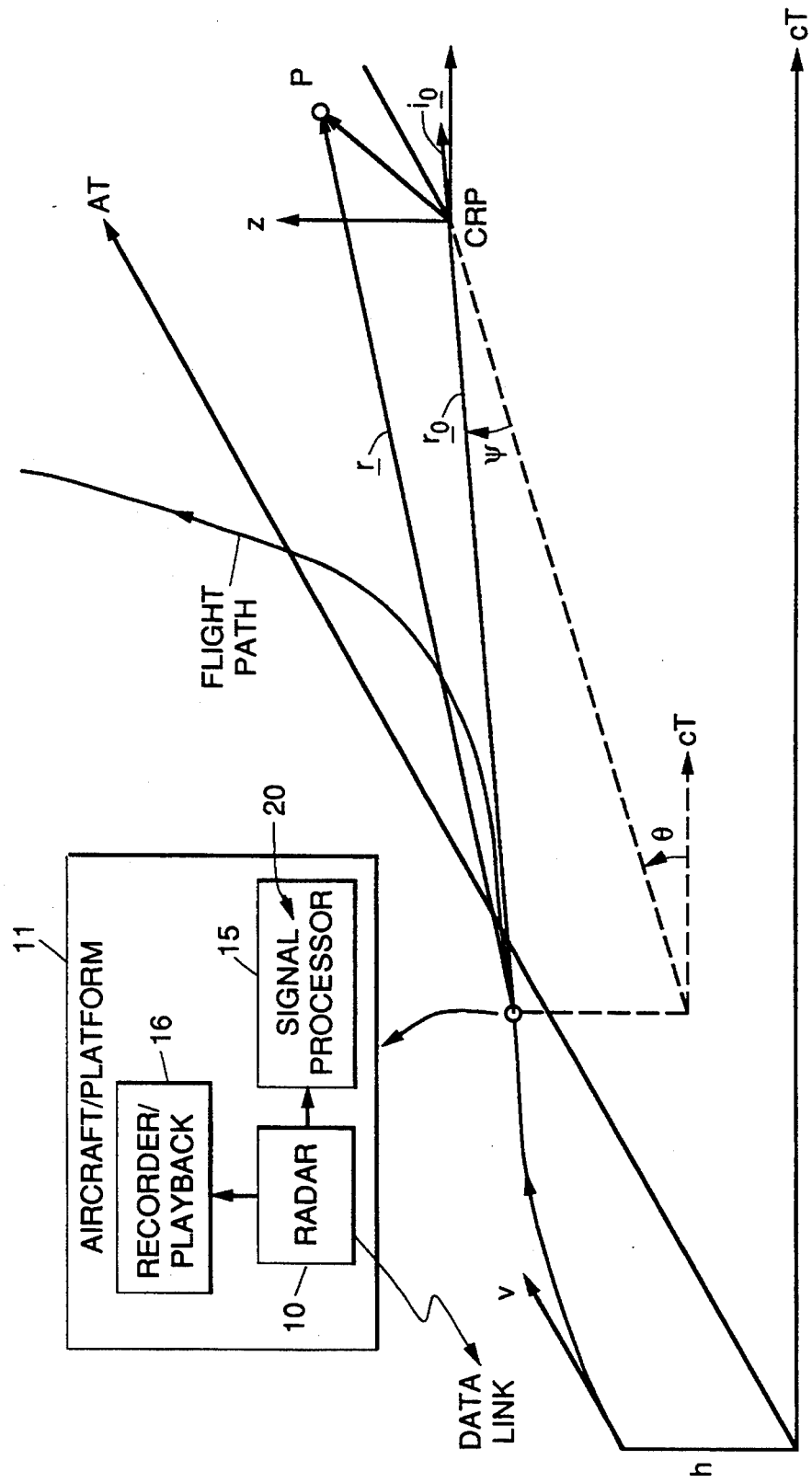
FIG. 1 illustrates a SAR radar system and the aircraft flight geometry employed in utilizing the present invention.

Referring to the drawing figures, FIG. 1 illustrates a general flight geometry encountered when using a SAR radar system 10 disposed on a moving platform 11 or aircraft 11 that incorporates a SAR signal processor 15 in accordance with the principles of the present invention. The SAR signal processor 15 may be disposed with the radar system 10 or may be remotely located. Data may be data-linked to the SAR signal processor 15 or recorded on-board the platform 11 using a recorder/playback unit 16 and played back in a processing laboratory, for example. The SAR radar system 10 is conventional, but the signal processor 15 implements a processing method 20 in accordance with the present invention that determines terrain height data. The specifics of the processing method 20 will be described with reference to FIG. 2.

Figure 2:
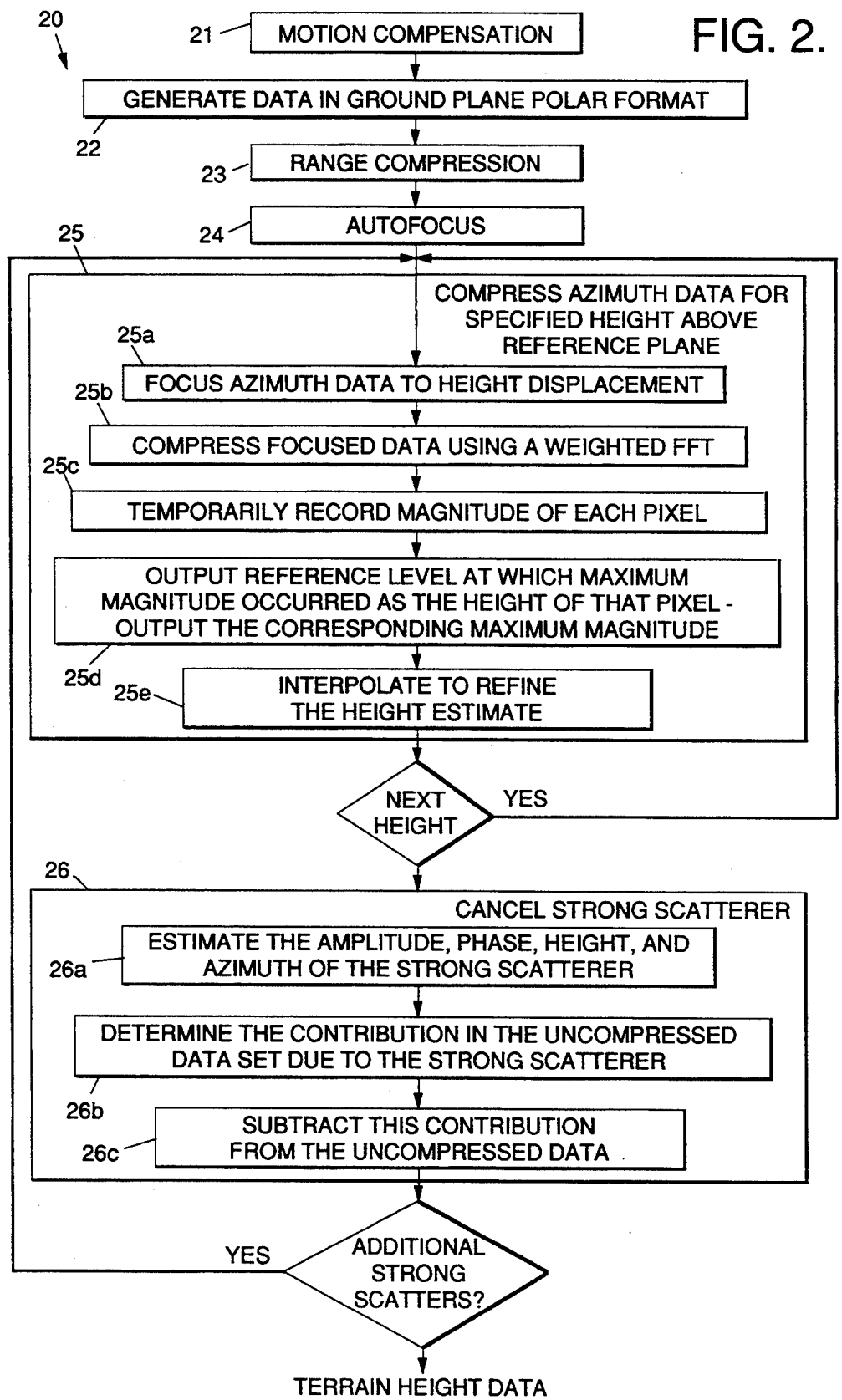
FIG. 2 illustrates a processing flow diagram of a processing method in accordance with the principles of the present invention that is used in the SAR radar system of FIG. 1.

FIG. 1 shows the aircraft 11 incorporating the radar system 10 that is moving at velocity v and at terrain height h above a cross track horizontal axis ct along an arbitrary flight path. The point CRP corresponds to a central reference point. P is the location of an arbitrary scatter. The vector AT represents the along track horizontal axis. FIG. 2 illustrates a processing flow diagram of the processing method 20 in accordance with the principles of the present invention that is used in the SAR radar system 10 of FIG. 1. The processing steps of the present SAR processing method 20 are as follows.

The radar system 10 is operated in the same way as a conventional SAR radar system. The platform 11 on which the radar system 10 is mounted is operated to produce out-of-plane motion. The out-of-plane motion is proportional to height sensitivity and the processing load associated with the height estimation calculations performed by the signal processor 20 that implements the present invention. The radar return data is initially processed using conventional processing techniques to provide motion compensation as indicated in step 21, generate data in a ground plane polar format as indicated in step 22, provide range compression as indicated in step 23, and provide for autofocus as indicated in step 24.

In accordance with the present invention, compression of azimuth data (azimuth compression) is implemented as indicated in step 25. Each range bin is treated the same during azimuth compression processing. Azimuth (uncompressed) data is focused for each of many discrete terrain height reference levels as indicated in step 25a. The height increments are subject to further refinement, but a maximum phase difference of 90 degrees between focus schedules for adjacent height reference levels is recommended. Total number of terrain height reference levels may be based on a prior knowledge of terrain roughness. The focused data is compressed using a weighted FFT as indicated in step 25b and the magnitude of each pixel is temporarily recorded as indicated in step 25c. Separate magnitudes are stored for each terrain height reference level for each pixel (azimuth pixel). The largest of the terrain height reference levels for each pixel is output as the radar cross section (RCS) of that pixel. The reference level at which that maximum occurred is output as the height of that pixel as indicated in step 25d. Interpolation may be used to refine the height estimate as indicated in step 25e. The process of selecting the maximum magnitude for each pixel and saving the height for which that maximum was achieved may be accomplished without storing all computed magnitudes by maintaining a two component output vector whose contents are only replaced if the current focus (and associated height) produces a larger magnitude.

A strong return generally improves the quality of the height estimate for the pixel corresponding to the location of the scatterer, but corrupts the height and backscatter estimates in the vicinity of the strong scatterer. This effect is mitigated by canceling the strong scatterer signal as indicated in step 26. The amplitude phase height and azimuth of the strong scatterer is first estimated as indicated in step 26a. These parameters are used to determine the contribution in the uncompressed data set due to the strong scatterer as indicated in step 26b. This contribution is then subtracted from the uncompressed data as indicated in step 26c and the above height estimating process (step 26a) is repeated for improved accuracy.

Most autofocus techniques are based on averages over an entire image (or its Fourier transform) of statistical quantities. The resulting estimate of global phase error typically includes a component corresponding to average difference between the terrain and an image plane used to define the ground plane radar format transformation and motion compensation. Therefore, all height estimates share a common unobservable offset.

One effective display format that requires minimal processing involves a hue-saturation-intensity encoding scheme. The radar cross section of each pixel is encoded as brightness and the height of each pixel is encoded as hue. One scheme displays each color at maximum saturation or spectral purity. A second scheme estimates height accuracy at each pixel and encodes accuracy as saturation such that the most accurate pixels are displayed at maximum saturation (e.g. yellow), while those with modest accuracy are at low saturation (e.g. brown), and those that are unreliable are displayed with zero saturation (grey). The accuracy estimate is a function of the second derivative (or difference) of the pixel RCS with respect to reference height evaluated at the maximum response.

An alternative color display approach computes a separate image for each of the three color guns of the CRT. The separate images are the weighted sum of the power response from each reference height. The weights for the red gun are heaviest for large positive heights, the weights for the green gun are heaviest for heights near zero, and the weights for the blue gun are heaviest for large negative heights. These weightings are smooth and resemble the color response function of the three different types of cones in the retina.

Other display techniques may be used to aid in visualizing the surface topography based on the radar derived terrain height estimates. These techniques are similar to those used in generating topographic map products such as synthetic shaded relief perspective renderings and contour plotting.

To achieve long range standoff reconnaissance, the SAR vehicle 11 (manned or unmanned) is operated to achieve a significant out-of-plane motion during the coherent data correction period (synthetic array interval). This out-of-plane motion induces defocusing phase errors proportional to target height above a reference plane in the field of view of the SAR radar system 10.

For many air to ground attack missions, minimum vulnerability is realized with a low altitude approach so that the attack aircraft 11 moves through any SAM engagement envelope as quickly as possible. Prior to weapon release a pilot may want to image the target area with the radar system 10 which entails a pop-up maneuver. With the signal processing provided by the present invention, the pop-up maneuver is exploited to provide good (if not maximum) sensitivity to terrain height. A natural fallout of the present processing method 20 is that terrain height focus errors are connected to improve the SAR image. Display of height data may be combined with SAR data by using the color CRT. The height data may be represented as hue and the radar backscatter data as brightness as discussed above.

The terrain elevation data and co-registered imagery provided by the SAR radar system 10 and signal processing method 20 of the present invention has a number of non-military applications. It may be used to map inaccessible terrain in support of flood control and construction planning. It may be used to provide map updates to monitor ongoing or potential disasters such as volcanic eruptions, earthquakes, and flooding. Its insensitivity to small movements of objects in the field of view makes the present system 10 and method 20 especially attractive for mapping wooded areas.

The following is a discussion of the ground plane polar format transformation employed in the present invention. Polar format transformation is a widely used method of SAR processing at very high resolution to achieve a large horizontal depth of field. The ground plane polar format technique for achieving very high resolution SAR imaging takes two forms: a conventional slant plane transformation (SPT), and a ground plane transformation (GPT) utilized in the present invention. Both transformations define a central reference point (CRP) in the scene. The slant plane transformation produces a focused map of the slant plane passing through the radar and central reference point, whereas the ground plane transformation produces a focused map of a ground plane passing through the central reference point. For straight-line flight, the SAR resolution cells for both transformations are cylindrical tubes whose cross section is the design resolution, extending vertically and penetrating both the ground and slant planes. Thus either transformation produces a focused map of scatterers, whether located on or outside their respective planes. However, the relationship between a scatterer's apparent location in the output map, and its true three-dimensional location, is different for the two transformations, so they exhibit distinct geometrical map distortion characteristics.

However, when the radar accelerates out of the slant plane, as in a maneuver, simulations of the slant plane transformation and the ground plane transformation have shown that each focuses properly in its respective plane, but that scatterers outside the respective planes are defocused by an amount proportional to their displacement from the planes. Thus the slant plane transformation is rendered ineffective for mapping the ground plane, but even the ground plane transformation will produce a defocused map if the true ground surface departs too far from the processor ground plane through the designated central reference point (even the central reference point will not, in general, lie on the physical ground, unless the radar possesses precise geometrical information).

To see what might be done to extend the region of focus for an accelerating radar, the polar format transformation has been rederived from a more fundamental point or view than in the past, emphasizing arbitrary radar motion. The transformation that results is three-dimensional, two of which are identical to the ground plane transformation. The third dimension may be used to refocus the data for other planes parallel to the primary ground plane through the central reference point.

Although the transformation is three-dimensional, the data storage normally lies on a surface within the three-dimensional storage space, so only two-dimensional storage is required. The value of the third dimension is simply stored along with the radar data in a two-dimensional format. To produce a focused map of a plane parallel to but displaced from the basic ground plane through the central reference point, each radar signal data value is multiplied by a phasor function of the corresponding third dimension, prior to two-dimensional FFT processing.

The basic polar format depth of field referred to above is distinct from the depth of field effect about the ground plane (for the ground plane transformation) produced by radar acceleration. This three-dimensional approach to the polar format transformation provides a physical picture of the SAR resolution cell shape under accelerating conditions, and thus the nature of this acceleration-produced defocusing.

The process for translating the plane of focus up and down from the primary ground plane has been verified by simulation. Not only is the defocusing compensated, but the geometric distortion due to scatterer altitude is removed.

Table 1 shows simulation results without correction. The inputs to a simulation run are the x,y,z coordinates of the scatterer, squint angle (T) from broadside $\bar{\theta}$, and bank angle (A0) of the turn. The simulation prints out the location of the scatterer response in the two-dimensional FFT output, and a 5×5 array of uniformly spaced samples of the nonlinear component of the phase recording spanning the aperture.

The first run is for a scatterer at x=100 ft, y=100 ft, z=0, $\bar{\theta}$=0, and a 20 degree bank turn. It is seen that the response is at x=100.01 ft, y=99.97 ft, and the phase recording is linear over the aperture to within about 0.01 radian. The ground plane transformation properly compensates for out-of-plane acceleration of the radar system 10 and for scatterers in the processor ground plane, z=0.

The second run changes the altitude of the scatterer to z=100 ft. The position of the response is shifted, predominantly cross-track, the usual geometric distortion associated with scatterer displacement out of the ground plane. The phase recording now has about 12 radians of predominantly crossradial quadratic phase distortion. The third simulation run is for z=−100 ft., and the result is a change in sign of the distortion effects. The final two runs are similar except are for a point out at x=1000 ft, y=1000 ft. The effects of scatterer altitude are about the same, plus some phase distortion, the basic polar format depth of field effect that is present whether the radar system 10 is accelerating or not.

TABLE 1

```
INPUT X,Y,Z,T,A0
? 100,100,0,0,20
OUTPUT LOCATION =      100.014      +J    99.9653
   -0.009    -0.009    -0.009    -0.009    -0.010
   -0.002    -0.002    -0.003    -0.003    -0.003
        0         0         0         0         0
   -0.003    -0.003    -0.003    -0.003    -0.003
   -0.011    -0.011    -0.011    -0.011    -0.010
ARRAY PERIOD = 33.9251 SEC
INPUT X,Y,Z,T,A0
? 100,100,0,0,20
OUTPUT LOCATION =       80.5035     +J   105.484
   10.605    10.447    10.294    10.145    10.000
    2.722     2.682     2.642     2.603     2.566
   -0.001    -0.001         0    -1.001         0
    2.873     2.826     2.781     2.737     2.694
   12.141    11.931    11.728    11.532    11.343
ARRAY PERIOD = 33.9251 SEC
INPUT X,Y,Z,T,A0
? 100,100,0,0,20
OUTPUT LOCATION =      119.552     +J    94.4393
  -10.636   -10.478   -10.325   -10.176   -10.032
   -2.731    -2.690    -2.651    -2.612    -2.575
```

TABLE 1-continued

| | | | | |
|---|---|---|---|---|
| −0.001 | −0.001 | 0 | 0 | 0 |
| −0.004 | −0.004 | −0.003 | −0.003 | −0.003 |
| −0.014 | −0.014 | −0.013 | −0.013 | −0.012 |

ARRAY PERIOD = 33.9251 SEC
INPUT X,Y,Z,T,A0
? 100, 100,0,0,20

| OUTPUT LOCATION = | | 1001.44 | +J | 996.534 |
|---|---|---|---|---|
| −0.852 | −0.860 | −0.869 | −0.875 | −0.883 |
| −0.215 | −0.229 | −0.228 | −0.233 | −0.242 |
| −0.001 | −0.001 | 0 | 0 | 0 |
| −0.273 | −0.258 | −0.245 | −0.232 | −0.215 |
| −1.124 | −1.083 | −1.042 | −1.007 | −0.968 |

ARRAY PERIOD = 33.9251 SEC
INPUT X,Y,Z,T,A0
? 100, 100,0,0,20

| OUTPUT LOCATION = | | 981.979 | +J | 1002.08 |
|---|---|---|---|---|
| 9.714 | 9.549 | 9.389 | 9.233 | 9.084 |
| 2.498 | 2.453 | 2.405 | 2.360 | 2.318 |
| −0.001 | 0 | 0 | −0.001 | 0 |
| 2.593 | 2.560 | 2.530 | 2.500 | 2.470 |
| 10.984 | 10.875 | 10.649 | 10.491 | 10.339 |

ARRAY PERIOD = 33.9251 SEC

Table 2 shows a repeat of the runs of Table 1 except that phase correction has been added to the ground plane transformation recording prior to FFT processing. It is seen that the phase and geometric distortion due to acceleration of the radar system 10 has been essentially removed.

TABLE 2

INPUT X,Y,Z,T,A0
? 100,100,0,0,20

| OUTPUT LOCATION = | | 100.014 | +J | 99.9653 |
|---|---|---|---|---|
| −0.009 | −0.009 | −0.009 | −0.009 | −0.010 |
| −0.002 | −0.002 | −0.003 | −0.003 | −0.003 |
| 0 | 0 | 0 | 0 | 0 |
| −0.003 | −0.003 | −0.003 | −0.003 | −0.003 |
| −0.011 | −0.011 | −0.011 | −0.011 | −0.010 |

ARRAY PERIOD = 33.9251 SEC
INPUT X,Y,Z,T,A0
? 100,100,0,0,20

| OUTPUT LOCATION = | | 100.033 | +J | 99.9647 |
|---|---|---|---|---|
| −0.021 | −0.021 | −0.020 | −0.021 | −0.020 |
| −0.006 | −0.006 | −0.006 | −0.006 | −0.006 |
| 0 | 0 | 0 | 0 | 0 |
| −0.006 | −0.006 | −0.006 | −0.006 | −0.006 |
| −0.025 | −0.024 | −0.024 | −0.023 | −0.010 |

ARRAY PERIOD = 33.9251 SEC
INPUT X,Y,Z,T,A0
? 100,100,0,0,20

| OUTPUT LOCATION = | | 100.023 | +J | 99.9689 |
|---|---|---|---|---|
| −0.011 | −0.011 | −0.011 | −0.011 | −0.011 |
| −0.003 | −0.003 | −0.003 | −0.003 | −0.003 |
| 0 | 0 | 0 | 0 | 0 |
| −0.004 | −0.004 | −0.003 | −0.003 | −0.003 |
| −0.014 | −0.014 | −0.013 | −0.013 | −0.012 |

ARRAY PERIOD = 33.9251 SEC
INPUT X,Y,Z,T,A0
? 100,100,0,0,20

| OUTPUT LOCATION = | | 1001.44 | +J | 996.534 |
|---|---|---|---|---|
| −0.852 | −0.860 | −0.869 | −0.875 | −0.883 |
| −0.215 | −0.229 | −0.228 | −0.233 | −0.242 |
| −0.001 | −0.001 | 0 | 0 | 0 |
| −0.273 | −0.258 | −0.245 | −0.232 | −0.215 |
| −1.124 | −1.083 | −1.042 | −1.007 | −0.968 |

ARRAY PERIOD = 33.9251 SEC
INPUT X,Y,Z,T,A0
? 100,100,0,0,20

| OUTPUT LOCATION = | | 1001.44 | +J | 996.534 |
|---|---|---|---|---|
| −0.912 | −0.918 | −0.925 | −0.931 | −0.936 |
| −0.231 | −0.235 | −0.243 | −0.248 | −0.253 |

TABLE 2-continued

| | | | | |
|---|---|---|---|---|
| −0.001 | 0 | 0 | 0 | 0 |
| −0.286 | −0.273 | −0.256 | −0.243 | −0.229 |
| −1.181 | −1.141 | −1.102 | −1.064 | −1.025 |

ARRAY PERIOD = 33.9251 SEC

Thus there has been described a new and improved terrain height radar system comprising a signal processing method that computes terrain height and radar backscatter power and calculates terrain relief while performing SAR imaging. It is to be understood that the above-described embodiment is merely illustrative of some of the many specific embodiments which represent applications of the principles of the present invention. Clearly, numerous and other arrangements can be readily devised by those skilled in the an without departing from the scope of the invention.

What is claimed is:

1. A radar signal processing method for use with a synthetic array radar, said method comprising the steps of:

operating the synthetic array radar to produce out-of-plane motion and generating radar return signals derived therefrom;

processing the radar return signals to compensate for relative motion and provide motion compensated data;

processing the motion compensated data to generate ground plane polar format data;

processing the ground plane polar format data to generate range compressed data;

processing the range compressed data to generate autofocused data; and processing the autofocused data to generate azimuth compressed data in accordance with the following steps:

focusing uncompressed azimuth data for each of many discrete terrain height reference levels;

compressing the focused data using a weighted Fourier transform;

temporarily storing the magnitude of each pixel;

outputting the largest magnitude from among all of the magnitudes for each of the terrain height reference levels for each pixel as a radar cross section value of that pixel; and outputting the reference level at which that maximum occurred as the height of that pixel.

2. The method of claim 1 which further comprises the step of:

canceling strong scatterer signal in accordance with the following steps:

estimating the amplitude phase height and azimuth of the strong scatterer;

using these parameters to determine a contribution in the uncompressed data set due to the strong scatterer;

subtracting this contribution from the uncompressed data; and repeating the amplitude phase height and azimuth height estimating step for improved accuracy.

3. The method of claim 1 which further comprises the step of interpolating the height estimate.

* * * * *